United States Patent [19]

Kessler et al.

[11] 4,444,279
[45] Apr. 24, 1984

[54] DRILLING TOOL

[75] Inventors: Juergen Kessler, Stuttgart; Harry Melzer, Leinfelden-Echterdingen, both of Fed. Rep. of Germany

[73] Assignee: Hilti Aktiengesellschaft, Schaan, Fed. Rep. of Germany

[21] Appl. No.: 164,276

[22] Filed: Jun. 30, 1980

[30] Foreign Application Priority Data

Jul. 14, 1979 [DE] Fed. Rep. of Germany ....... 2928555

[51] Int. Cl.³ .................... B23B 29/034; E21B 23/00
[52] U.S. Cl. .................................. 175/202; 175/286; 175/289; 175/291; 82/1.2; 82/1.4
[58] Field of Search .................... 82/1.2, 1.4; 408/154, 408/155, 158, 169; 175/202, 285–291

[56] References Cited

U.S. PATENT DOCUMENTS

| 981,306 | 1/1911 | Pollock. | |
|---|---|---|---|
| 1,663,048 | 3/1928 | Hartson. | |
| 1,822,216 | 9/1931 | Hartson. | |
| 1,858,926 | 5/1932 | Grau et al.. | |
| 2,358,516 | 9/1944 | Knapp | 408/169 |
| 2,365,549 | 12/1944 | Haynes | 82/1.2 |
| 2,427,052 | 9/1947 | Grant. | |
| 2,457,269 | 12/1948 | Pfrehm | 82/1.2 |
| 2,638,327 | 5/1953 | Baldwin | 255/77 |
| 3,208,312 | 9/1965 | Heuser | 82/1.2 |

FOREIGN PATENT DOCUMENTS

| 26603 | 4/1884 | Fed. Rep. of Germany. | |
|---|---|---|---|
| 157364 | 12/1904 | Fed. Rep. of Germany. | |
| 2700700 | 7/1977 | Fed. Rep. of Germany. | |
| 2723785 | 5/1979 | Fed. Rep. of Germany. | |
| 321897 | 9/1902 | France. | |
| 322059 | 9/1902 | France. | |
| 322874 | 10/1902 | France. | |
| 2338119 | 7/1977 | France. | |
| 2366080 | 6/1978 | France | 82/1.2 |

Primary Examiner—Leonidas Vlachos
Attorney, Agent, or Firm—Toren, McGeady and Stanger

[57] ABSTRACT

A drilling tool adapted to produce a radial enlargement along a cylindrical elementary drilled hole in concrete masonry. The tool comprises at least one cutter which is mounted in a slot in a drill sleeve which enters the elementary drilled hole, this cutter being held so as to be fixed in the peripheral direction and axially but movable radially by an inner spreader element, provided with chamfered surfaces, which is movable axially relatively to the drill sleeve. This spreader element is in one piece with the shank, which is directly rotatively driven, is movable axially relatively to the drill sleeve and is close-fitted therewith in the peripheral direction. The end of the drill sleeve projecting out of the elementary drilled hole is connected to an abutment piece which determines the location of the radial enlargement along the drilled hole.

2 Claims, 11 Drawing Figures

DRILLING TOOL

The present invention relates to a drilling tool adapted for making a radial enlargement along a cylindrical elementary drilled hole, this latter term including a bore or drilled hole made by any suitable means. The tool of the type covered by the present invention is one including at least one cutter which is held in a slot in a drill sleeve, (which is adapted to penetrate the elementary drilled hole) so as to be non-rotatable and axially immobile but radially movable in this slot, and an inner spreader element provided with at least one chamfered surface which is movable axially relatively to the drill sleeve to push out said cutter.

In a drilling tool of this type which is disclosed in German Federal Offenlegunschrift No. 27,00,700 the spreader element is not rotatably held in the drill sleeve and projects substantially from the leading end of the drill sleeve for axial movement. In other words the spreader element is axially movable by the fact that it can be supported on the base of the elementary drilled hole during the further axial advance of the drill sleeve. This means that the drill sleeve moves in the axial direction during the production of the enlargement so that only enlargements of this character can be made which define a conical formation starting from the elementary drilled hole. A further disadvantage of this known form of drill tool resides in the fact that the position of the enlargement along the elementary drilled hole is exclusively dependent of the length of the spreader element which projects from the drill sleeve in the rest condition.

It is an object of the present invention to provide a drilling tool of the kind set forth above which is of simple construction and enables the production of an enlargement in the drilled hole which adjoins the cylindrical section of the elementary drilled hole, as viewed in the direction of drilling, through a countersink.

This problem is met in accordance with the invention in a tool of the kind set forth above by the fact that the spreader element is firmly connected to the directly-and rotatively driven tool shank, which is adapted for movement in the axial direction relatively to the drill sleeve and is close-fittedly engaged therewith in the peripheral direction, and that the end of the drill sleeve projecting from the elementary drilled hole is connected to an abutment piece which determines the position of the radial enlargement in the elementary drilled hole.

Thus in a drilling tool according to the invention the cutter held in the shank of the drill is fixed in the axial direction which enables an enlargement to be made which adjoins the cylindrical section of the elementary drilled hole through an annular shoulder. This kind of enlargement in the hole is important when used for a particular kind of so-called close fitted peg in masonry, preferably concrete masonry. The drilling tool however can also be used for the formation of countersunk enlargements of drilled holes in metallic objects. In an embodiment of the present invention the drill sleeve provided with the cutter or cutters is immovable in the axial direction in that it is firmly connected with the abutment piece. In this event the or each cutter is of a width representing the proposed length of the enlargement which is to be formed thereby.

In another embodiment of the present invention both the drill shank with the spreader element, and also the drill sleeve are movable to a limited degree in the axial direction. This means that the enlargement of the drilled hole with the cutters distended can be lengthened and consequently the cutters have to be made of lesser width, which is an advantage having regard to the effort which has to be expended during the drilling.

Moreover in another embodiment of the invention provision is made for simple replacement of the cutters at the leading end of the drill sleeve. Thus the cutters can be pushed into the slots, which are open at the leading end, and held therein by means of a screw cap which is threaded on to the end of the drill sleeve. A guide ring is slipped over the drill sleeve immediately behind the cutters, this ring being provided with radial formations which engage in the slots and constitute surface guidance of the cutters. In addition a spacer can be arranged in front of the end of the drill sleeve which is provided peripherally with axial formations which likewise engage in the slots so that the slotted end of the sleeve is reinforced in this way.

Further details and forms of the invention are described in more detail below with reference to embodiments thereof illustrated in the accompanying drawings, in which.

Figure 4:
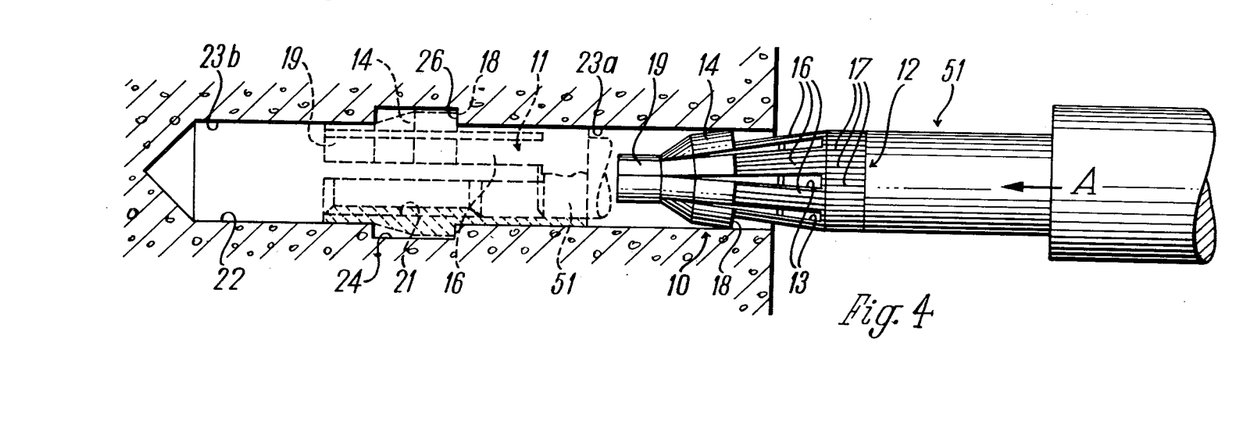
FIG. 4 is a side view, partly in section, showing the implanting of a peg in the drilled hole which has been finished, that is to say provided with an enlargement.

Reference will first of all be made to FIG. 4 in which an undercut drilled hole 22 formed in a concrete wall or the like is shown with a peg 10, preferably metallic and for receiving a screw or the like and an implanting tool 51, can be close fittedly inserted, and having an enlargement 24 which can be made by means of the drilling tool 131, 231 or 331 according to a preferred embodiment of the present invention.

The peg illustrated consists of a single integral part, namely a peg sleeve 11 which is longitudinally slotted six times in the example illustrated up to a ring 12 at the rear end. This produces longitudinally extending segmental arms uniformly distributed around the periphery, and by virtue of the longitudinal slots 13 of equal length and width and of the resilient material of these arms, the latter can be compressed together so that they taper in outer diameter at least to the inner diameter of the elementary hole 22, as illustrated in full line in FIG. 4. These segmental arms constitute a number of parts, namely a leading part 14 which is connected to the ring 12 through the bridge pieces 16. Whilst the ring 12 and the bridge pieces 16 are provided externally with longitudinally-extending ribs and corresponding grooves, of like external diameter, the segmented leading part 14 is provided with an annular shoulder 18 at the end adjoining the bridge pieces 16. The leading part 14 is, over approximately half its axial length, of cylindrical form and adjoining this is tapered conically peripherally towards its outer end down to the outer diameter of the bridge pieces 16 and the ring 12, this then being adjoined by a segmented extension 19 of a cylindrical external diameter equal to that of the ring 12. The peg sleeve 11 is provided with external threading 21 which extends from the free end of the extension 19 over the complete length of the leading part 14 and over a part of the length of the bridge pieces 16.

The elementary drilled hole 22 must of course be of a form similar to that of the peg 10, that is to say with a countersunk enlargement 24 along the elementary hole 22 and divided between the parts 23a and 23b of the hole. In a modification this enlargement 24 widens out abruptly from the hole 23a to form an annular shoulder 26, then extends axially, that is to say coaxially, and then merges, again abruptly into the cylindrical part 23b of the hole. As illustrated in dotted lines in FIG. 4, this enlargement 24 accommodates the leading part 14 of the peg sleeve, the annular shoulder 18 thereby bearing against the shoulder 26 in the hole. In this rest condition, that is to say the expanded condition of the peg sleeve 11, the ring 12 and the bridge pieces 16 are accommodated in the part 23 of the drilled hole and the extension 19 in the drilled hole section 23b, all without any substantial play.

Figure 1:
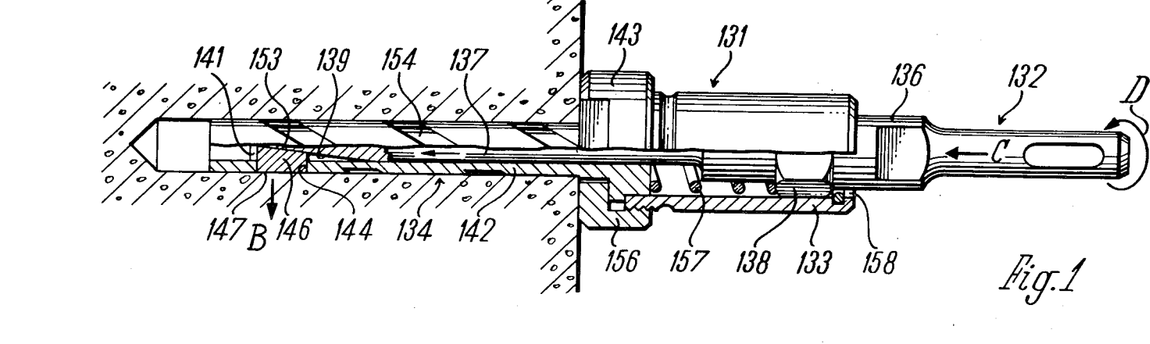
FIG. 1 illustrates a drilling tool in accordance with a first embodiment of the present invention shown sunken in an elementary drilled hole up to the point at which it is in abutment with the masonry and in a position before the enlargement in the hole is formed, this view being partly in section and partly in side view.
Figure 2:
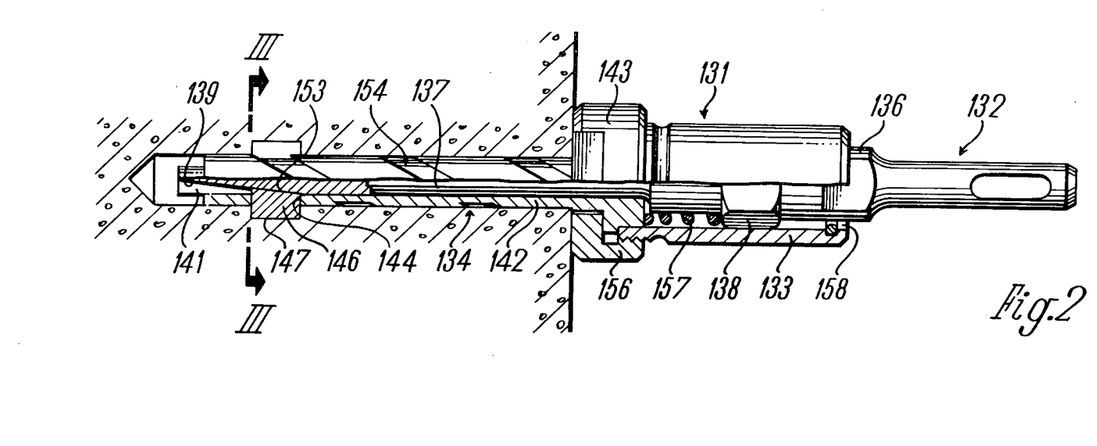
FIG. 2 shows, likewise partially in side view and partially in section, the tool illustrated in FIG. 1 but in an end position in which the elementary drilled hole has been provided with an enlargement.

A tool 131 for producing the enlargement 24 in the elementary hole 22 of a specific diameter, for example produced by a standard commercial rock drill, is to be found in FIGS. 1 and 2. The tool 131 substantially comprises a part 132 which is driven by a drilling machine or a percussion drill or rock hammer or the like and a part 134 which is moved therewith, that is to say rotatably driven, through a coupling sleeve 133, the two parts 132 and 134 being displaceable relatively to one another in the axial direction; in the embodiment illustrated the entrained part 134 is axially fixed whilst the drivable part 132 is movable in the axial direction. The drivable part 132 has a tool shank 136 and a tool spindle 137, adjoining the latter integrally through an external hexagon 138, which at its leading end is provided with two inclined and diametrically opposed chamfered surfaces 139 which constitute the base, in each case, of a groove 141.

Figure 3:
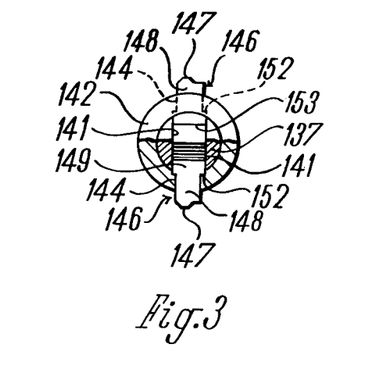
FIG. 3 is a section on the line III—III of FIG. 2.

The entrained part 134 has a sleeve-like drill shank or drill sleeve 142 which at one end is provided integrally with an abutment piece 143 of larger diameter and in which the tool spindle 137 of circular cross section is closely fitted as regards diameter, so that it is movable in the drill sleeve 142 in the axial direction (arrow C) without any substantial radial play. The drill sleeve 142 preferably has, in the vicinity of the end thereof adjacent the abutment 143 two diametrically opposed longitudinal slots 144 each of which accommodates a cutter 146 which is displaceable therein in the radial direction. As can be seen in particular from FIG. 3 each of these cutters 146 is provided at the end thereof projecting out of the sleeve 142 with cutter edges 147. In addition each cutter 146 is of substantially T-form in cross section, and the cutter body 148 is of a cross section with dimensions conforming with those of the slot 144 so as to be held therein without substantial play in the axial and in the peripheral direction and to be displaceable in the radial direction. The foot or root 149 of the cutter 146 is wider than that of the slot 144 so that the inner surface of the sleeve 142 can serve as an abutment against radial outwards movement of the cutter 146. This surface is provided with a recess 152 which is somewhat wider than the slot 144 so as to provide a step for serving as an abutment for the cutter 146 whereby the root 149 of the latter can be accommodated over a part of its thickness. The root 149 of each cutter 146 is provided with a chamfer 153 parallel to the contact surface 139 of the groove 141 of the tool spindle 137 and bears against this. This chamfered surface 153 and the contact face 139 are continuous, the inclination of the chamfer 153 being varied so as to extend approximately over the complete thickness of the root 149 as viewed over the length of the cutter 146.

The drill sleeve 142 is provided externally with a helically extending flat wide channel 154 which serves for disposal of the drilling swarf or waste. As mentioned the drill sleeve 142 is non-rotatably connected to the tool shank 136 or the tool spindle 137 through the coupling sleeve 133. For this purpose the coupling sleeve 133 is provided along its length with an inner hexagon which is of a shape close fitting with the outer hexagon 138 of the driving part 132. The other end is mounted on a part of the abutment 143, likewise of hexagonal shape, and is close fitted therewith as regarded in the direction of rotation, and held fixedly against axial movement by a nut 156 mounted from the abutment side on the abutment part 143 and screwed to the coupling sleeve 133. Arranged within the coupling sleeve 133 is a compression spring 157 which at one end bears against the abutment piece 143 and at the other end against the external hexagon 138 which in turn is applied against the end 158 of the coupling sleeve 133. By this means the driven part 132 is axially displaceable against the action of compression spring 157 within the entrained part 134 and the coupling sleeve 133, the compression spring 157 allowing for restoration of the driving part 132 back to the starting position (see FIG. 1) at all times.

As can further be seen from FIGS. 1 and 2 the drilling tool 131 of the present invention is pushed in its first rest or starting position so far into the part of the elementary drilled hole 22 the inner diameter of which corresponds to the outer diameter of the drill sleeve 142 until the abutment piece 143 is applied against the wall surface of the masonry concerned. In this condition the two cutters 146 are pushed inwards in the radial direction for their cutting edges 147 either to be flush with or lie within the external superfices of the drill sleeve 142, this being allowed for because the tool spindle 137 is retracted sufficiently in the starting position of the tool for the two surfaces 139 to cater for this. If now the shank 136 of the tool is rotated the rotational movement is also transmitted to the sleeve 142 and with it the cutters 146 which are held axially and peripherally in the slot 144. During this rotational movement, in the direction of arrow D, axial pressure is applied to the shank 136 of the tool so that this, together with the spindle 137, moves in the direction of arrow C. As a result, because the drill sleeve 142 is axially immobile, the two cutters 146 are moved radially outwards (arrow B) by the two surfaces 139 with running over the inclined surfaces 153. This produces an enlargement 24 of a depth corresponding to the cutters 146, adjoining the part 23a of the elementary drilled hole through a countersink. FIG. 2 illustrates the other end position of the drill 131 according to the invention in which the tool spindle 137 is pushed in completely and the cutters 146 are pressed outwards fully in the radial direction to produce the enlargement 24. During the running of the operating machine the tool spindle 137 is withdrawn again so that during the removal of the drill sleeve 142 the cutters 146 are moved back in the radial direction against the annular shoulder 26 in the hole. The radial dimensions of the cutters are large enough only so that, when the tool is out of action, that is to say when the drill sleeve 142 is removed from the spindle 137, the cutters 146 are pushed back internally, one after another (the others having their cutter edges 147 projecting completely from the drill sleeve) and can then be drawn out axially. This enables the cutters 146 to readily be replaced by fresh ones.

Figure 5:
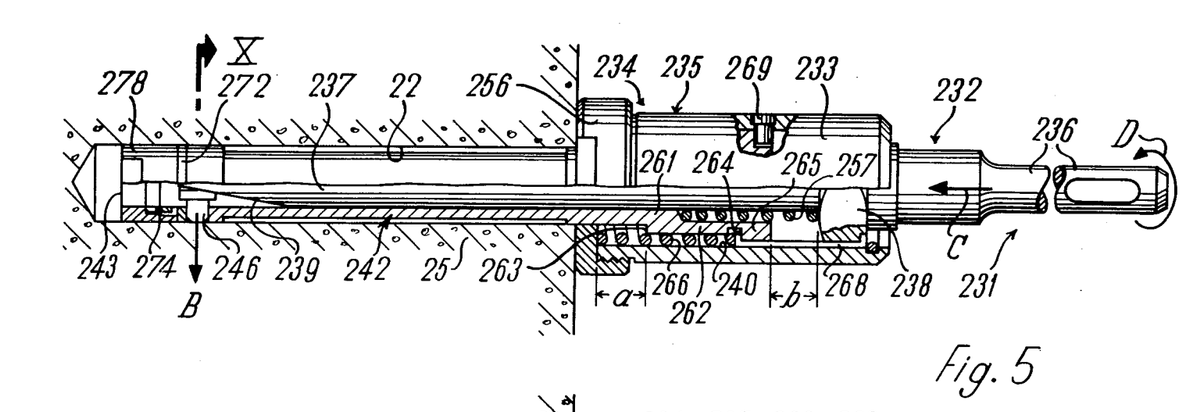
FIG. 5 illustrates a drilling tool in accordance with a second embodiment of the invention which is inserted in the drilled hole immediately prior to abutment and in a situation before the production of the enlargement in the hole, this view being partly in section and partly in side view.
Figure 6:
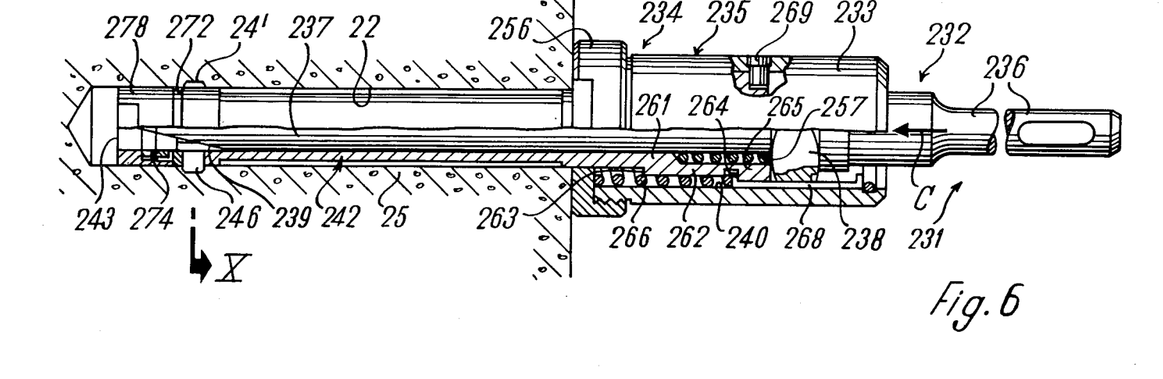
FIG. 6 illustrates the drilling tool of FIG. 5, but in an intermediate position in which the elementary hole has been partly provided with the enlargement.
Figure 7:
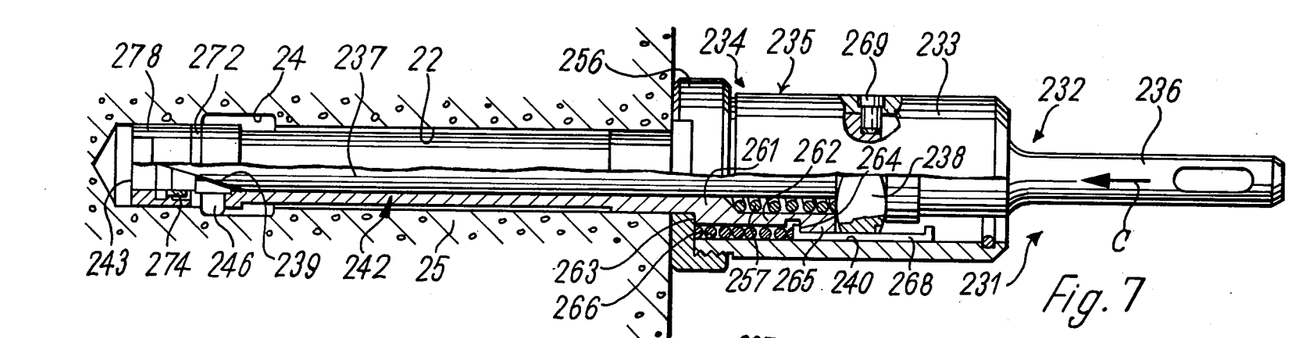
FIG. 7 illustrates the tool of FIG. 5 but in an end position in which the enlargement has been completed.

Another drilling tool 231 for producing the enlargement 24 in the elementary drilled hole 22 of a specific diameter made by a rock drill, for example of normally commercially available type, is seen in FIGS. 5 to 7. The tool 231 again basically comprises a part 232 operated by a drilling machine or a percussion drill or a rock hammer or the like and a part 234 carried along with these, that is to say rotatably driven through a coupling 235, the two parts 232 and 234 being displaceable relatively to one another in the axial direction; in this embodiment therefore again both the driven part 234 and also the driving part 232 are displaceable in the axial direction. The driving part 232 has a tool shank 236 and tool spindle 237 which acts in one piece therewith through an outer hexagon 238 and is provided at its leading end with two diametrically opposed chamfered surfaces 239.

The driven part 234 has a sleeve-form drill shank or a drill sleeve 242 one end of which is arranged in the coupling 235 and in it the tool spindle 237, which is of circular cross section, is inserted so as to fit therein in terms of the diameter, so that there is no substantial radial play between the drill sleeve 242 in its movement in the axial direction. The drill sleeve 242 has at its other leading end two diametrically-opposed longitudinal slots 244 in each of which a cutter 246 is held for movement in the radial direction. As can be seen particularly from FIGS. 9 and 10 each of these cutters 246 is provided at the end projecting from the drill sleeve 242 with cutting edges 247 provided with chamfers 259. Moreover each of the cutters 246 is substantially of T-shape in cross section, the cutter bodies 248 substantially following the cross sectional dimensions of the slots 244 such that it is held and capable of displacement in the radial direction in the slot 244 without any significant play in the axial or peripheral directions. The foot or root 249 of the cutter 246 is longer than the cutter itself and wider than the slot 244 concerned and is curved in a similar way to the drill sleeve 242 so that the inner surface thereof serves as a stop for the outward radial movement of the cutter 246 per arrow B. The root 249 of this cutter 246 is provided with a bevelled surface 253 which extends parallel to the run-on surface 239 of the tool spindle 237 and bears against this. The inclined surface 253 and the run-on surfaces 239 are of continuous form, the inclination of the bevel faces 253 being substantially such that they extend over the length of the cutter 246 as viewed over practically the complete thickness of the root 249.

Figures 8, 9, 10:
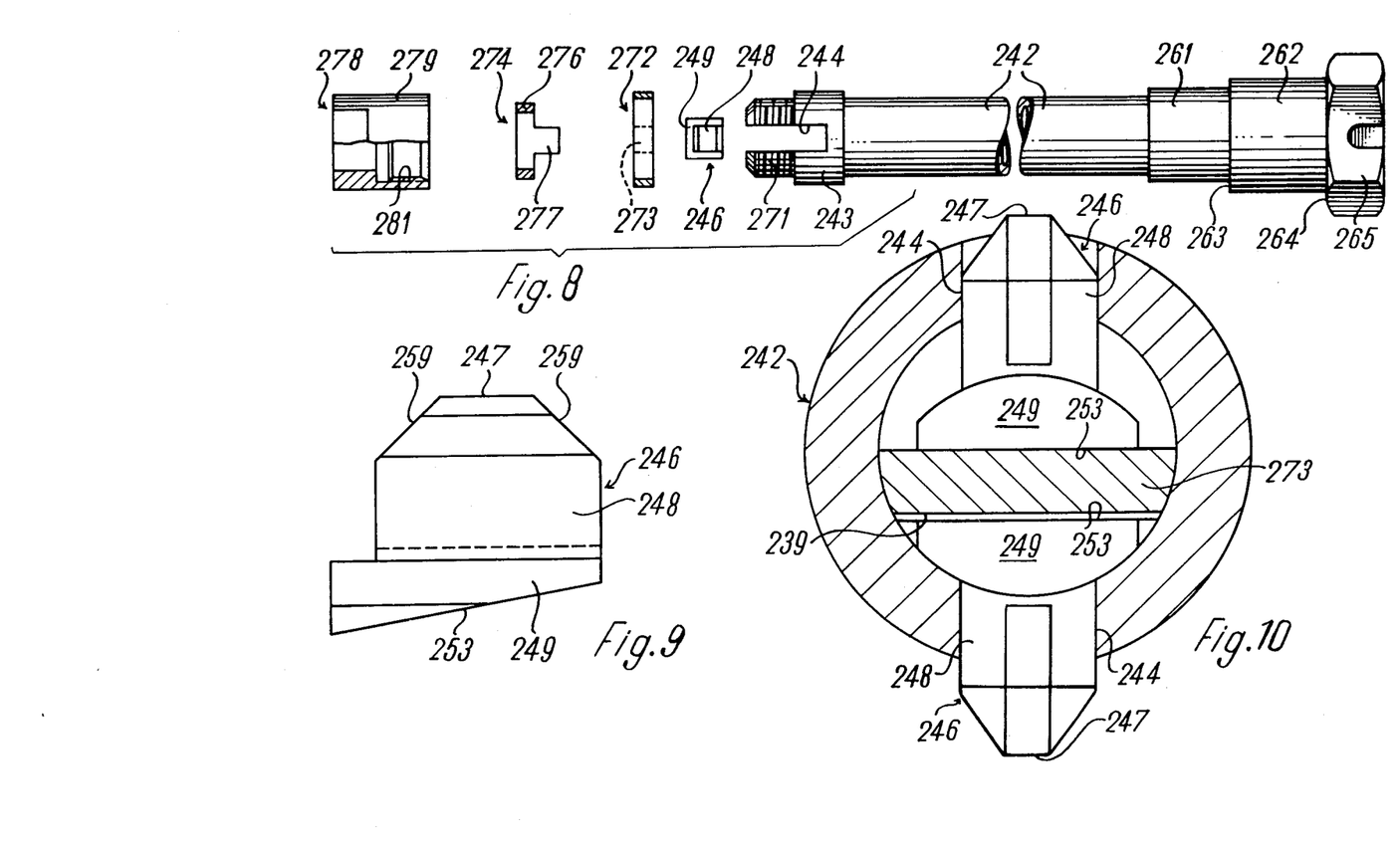
FIG. 8 is an exploded illustration of the drill sleeve showing the individual parts including those of the cutter element to illustrate the facility for replacing the cutters.
FIG. 9 is a side view of a cutter on a much enlarged scale.
FIG. 10 is a section on the line X—X of FIG. 5 or FIG. 6 on a substantially enlarged scale the upper half representing the basic condition of FIG. 5 and the lower half the projected condition of FIG. 6.

As can be seen from FIG. 8 the two cutters 246, one only of which is shown here, are replaceably mounted in the drill sleeve 242. The insertion of the cutters 246 for example is carried out by pushing them into the diametrically opposed slots 244 of the drill sleeve 242, which are open at the end, until the ends of the slots. Then the roots 249 of the cutters 246 become located within the drill sleeve 242 (see FIG. 10). A guide ring 272 is pushed over the end 243 of the drill sleeve 242, which is provided with external threading 271 and the slots 244, this ring having two diametrically opposed radial formations 273 which fit exactly in the slots 244 and thereby guard against rotation of the ring 272 and constitute the second guide surface for the radial movement of the cutters 246 provided at the opposite end of the slot. Thereafter a spacer 274 is pushed into the end 243, this comprising an annular part 276 of like diameter and two peripheral adjoining lugs 277 which outstand therefrom in the axial direction, these lugs having the shape of the longitudinal slots 244 and engaging in the latter. The outer diameter of the annular part 276 bearing against the end 243 is large enough to enable the spacer 274 to be engaged by the leading end 279 of a screw cap 278, which is provided with internal threading 281. Thus this screw cap 278 is pushed over the spacer 274 and screwed up on the end 243 of the drill sleeve. This holds the cutters 246 in the axial direction with play which caters for the radial movement. The withdrawal and replacement of the cutters 246 takes place in exactly the same procedure in reverse. As can be in particular noted from FIGS. 5 to 7 in this connection the outer diameter of the screw cap 278 is equal to the outer diameter in that area in which the cutters 246 are mounted or held for radial movement.

As mentioned the end 261 of the drill sleeve 242 away from the cutters 246 is mounted within the coupling 235 which comprises a coupling sleeve 233 and a nut 256 screwed up thereon, this serving during drilling both as an abutment and also for application to the masonry 25. The coupling sleeve 233 is provided over its length with an inner hexagon 240 which on the one hand provides an interfitted anti-rotational connection with the external hexagon 238 of the tool shank 236 and fits the inner end 261 of the drill sleeve 242, but on the other hand permits an axial movement both of the tool shank 236 and also of the drill sleeve 242.

The inner end 261 of the drill sleeve 242 is provided with a cup-form enlargement 262 which at its inner circular surface is at a spacing from the spindle 237 and has externally in two steps a front and a rear annular shoulder 263 and 264 respectively. Arranged in the cup-form enlargement 262 is a first compression spring 257 which bears against the lower end of the enlargement 262 on the one side and on the other side against the outer hexagon 238 of the shank 236. Externally the cup-form enlargement 262 is surrounded by a second compression spring 266 which at one end bears directly against the nut 256 and at the other end against the rear annular shoulder 264. The first inner compression spring 257 is of substantially weaker power than the second and outer compression spring 266, which for example can be achieved by a correspondingly more powerful preloading of the second compression spring 266.

The rest or basic position illustrated in FIG. 5 is achieved by the fact that the drill sleeve 242 bears at one part against a cross pin 269 in the coupling sleeve 233; in addition the outer hexagon 238 of the tool shank 236 is connected through a loop 268 with the drill sleeve and this by virtue of the fact that this determines the maximum spacing between these two parts. For this purpose the loop 268 engages at one end in a groove in or behind the external hexagon 238 and at the other end in a cup-form enlargement 262 or behind the rear annular shoulder 264. This determines, in the basic position both the spacing a between the leading annuler shoulder 263 of the drill sleeve 242 and the nut 256, and on the other hand the distance b between the opposed abutment faces of the cup-form enlargement 262 and the outer hexagon. It is to be mentioned that also the end section 265 of the drill sleeve 242 provided with the rear annular shoulder 264 is of hexagonal form, as can be seen more particularly from FIG. 8.

As can be further seen from FIGS. 5 to 7 the drill tool 231 is again, in its basic position per FIG. 5, pushed into the previously-formed elementary drilled hole 22 until the nut 256 bears against the wall face of the masonry construction 256 concerned.

During the ensuing rotational movement in the direction of arrow D an axial pressure is exerted on the tool shank 236 by the user so that the shank 236 first of all is moved only with the tool spindle 237 against the action of the first compression spring 257 in the direction of arrow C. First of all there is no axial movement of the drill sleeve 242 because the second compression spring 266, as mentioned above, is substantially more powerful than the first compression spring 257. As a result now the drill sleeve 242 remaining axially fixed, the two cutters 246 are continuously moved radially outwards by reason of the two run-on chamfers 239. This first produces a narrow enlargement 24′ corresponding to the cutters 246. This intermediate position in which the narrow enlargements 24′ are produced by drilling is shown in FIG. 6. In this position the tool spindle 237 is pushed in completely, that is to say the distance b corresponding to this movement has been limited or terminated with the external hexagon 238 at the end of the cup-form enlargement 262 is stopped. In addition the cutters 246 have been completely distended outwards in the radial direction.

If further pressure is now applied to the tool shank 236 in the axial direction C, the sleeve 242 is moved through the external hexagon 238 against the action of the second compression spring 266 in the axial direction per arrow C. Along with this axial movement of the drill sleeve 242 there is a further axial movement of the spindle 237 of the same amount so that the cutters 246 remain pushed out completely in the radial direction in accordance with FIG. 2. With the advance of the drill sleeve 242 and the cutters 246 the enlargement 24′ in the drilled hole is extended to the final enlargement 24, as can be seen from FIG. 7. The length of this enlargement 24 is equal to the size of the previously mentioned distance a. When, as illustrated in FIG. 7 the first annular shoulder 263 of the drill sleeve 242 comes up against the nut 256, this latter operating process is terminated, that is to say the tool 231 is in its end position.

During the running of the driving machine the tool spindle 237 is again retracted so that first of all the drill sleeve 242 and spindle 237 go back in common under the action of the second compression spring 266. This is followed by a further retraction of the tool spindle 237 so that the cutters 246 are freed in the axial direction and these are then pushed inwards from the drilled hole 22 during further withdrawal of the complete tool 231. The loop 268 is provided to counteract the friction which might occur during this performance because this guarantees the withdrawal of the sleeve 242 over the external hexagon 238 and the shank 236.

Figure 11:
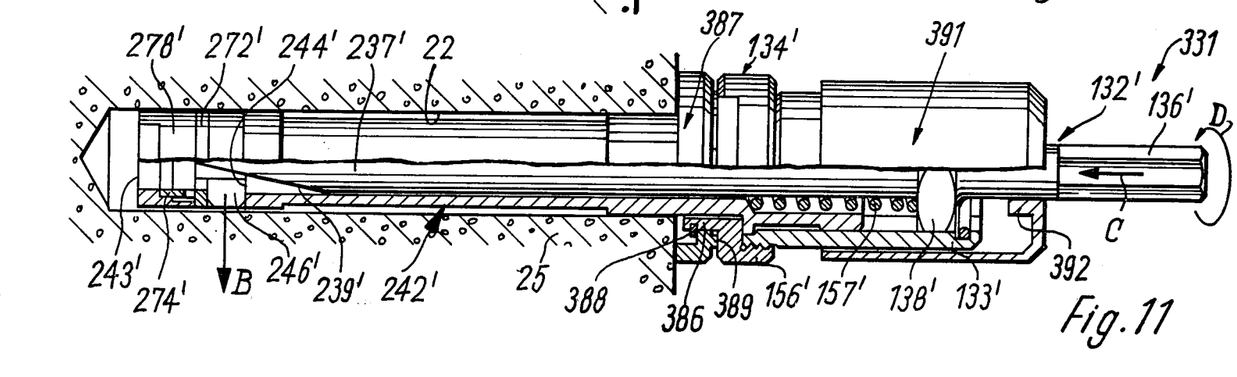
FIG. 11 is a drilling tool in accordance with a third embodiment of the invention shown in an elementary drilled hole being stopped by an abutment, the parts being in a position before production of the enlargement in the hole, partly in section and partly in side view.

The drilling tool 331 of a third embodiment of the present invention illustrated in FIG. 11 substantially comprises a combination of the two tools previously described, the rear part of this further tool, apart from two further additional features described below, corresponding to the rear part of the tool 131 of FIG. 1 and the leading part of the tool 231 of FIG. 5 in regard to the removability of the cutters. Thus in FIG. 11 the same reference numerals are used as applied to the drilling tools of FIGS. 1 and 5, with a prime. Because the functions of the individual constructional parts are the same in this case, a further reference to this function is unnecessary. In other words in this third embodiment the driving part 132′ is connected to the driven part 134′ in the same manner as in the first embodiment, that is to say is held against rotation and against axial movement, the driven part 134′ being immobile in the axial direction. The non-rotational coupling between the parts 132′ and 134′ is also here achieved by the connection of the external hexagon 138′ and the inner hexagon of the coupling sleeve 133′, which is firmly connected at its leading end with the nut 156′. This nut serves differently from that in the first embodiment of the present invention, and particularly in the case of large drilling tools is only used indirectly as an abutment against the masonry 25; thus it is provided at its leading end with an integrally-formed ring 386 of substantially smaller outer diameter on which an impact ring 387 is rotatably mounted and is held by a locking ring 388 in the axial direction. The impact ring 387, which is of U-form in cross section, is applied during actual operation with its leading face against the masonry 25. At the rear end thereof away from the nut 156′ the impact ring 387 has circular annular segments 389 which together are concentric to the longitudinal axis of the tool. These circular annular segments 389 constitute, because during the rotation of the drilling tool 331 the nut 156 turns therewith and the impact ring 387 remains stationary, a small definable sliding friction between these two parts, because their outer contact faces are very small. Moreover there is pressed additionally on the tool shank 136′, which at its driving end has an external hexagon, the rear and inwardly shaped end 392 of a sleeve 391. This makes the sleeve 391 movable with the tool shank 136′ in the axial direction. The leading end of sleeve 391 is spaced from the rear end of the nut 156′, which is of like diameter, by an amount which is necessary to allow axial travel in the direction of arrow C to produce the enlargement 24 in the drilled hole. When this distance has been travelled the operator can be sure that the cutters 246' have been extended to a maximum extent in the radial direction so that the enlargement 24 in the drilled hole is of the required diameter. As mentioned nothing further need be said as regards the leading end of the tool 331 with the elements 278', 274', 272' for replaceable retention of the cutters 246' at the leading end 243' of the spindle 237', because these are the same as the corresponding elements in the second embodiment.

It will be understood that if the enlargements 24 in the drilled hole made by the tools 231 and 331 are provided at the leading and rear ends with a conical formation, then the peg itself will also be correspondingly provided at the leading and rear ends with a chamfer. More particularly in the case of large diameters of the elementary drilled hole 22 and thus a larger outer peripheral area of the drill sleeves 142, 242, 242' more than two cutters 146, 246, 246', for example four cutters can be used and distributed uniformly around the periphery of the drill sleeve. The same applies to the run-up surfaces 139, 239, 339' of the tool spingle 137, 237, 237' associated with the cutters 146, 246, 246'.

We claim:

1. A drilling tool adapted to produce a radial enlargement along a cylindrical drilled hole, said tool comprising a drill sleeve with at least one slot therein, at least one cutter mounted in said slot, means for retaining said cutter in said slot against axial and rotational movement relative to said sleeve, and a spreader element provided with at least one chamfered surface mounted within said sleeve and movable axially relatively to the latter to engage said cutter with the chamfered surface and push out the cutter radially relatively to said sleeve, the improvement in which the tool is provided with a directly-drivable and rotatable shank which receives said drill sleeve, is close-fittedly engaged with the latter in the peripheral direction, is movable relatively to the sleeve in the axial direction, and is firmly connected to said spreader element, and in which the tool further includes an abutment piece to which the end of the drill sleeve projecting from the elementary drilled hole is connected in the working condition and which abuts against the work to determine the position of the radial enlargement in the drilled hole, both the spreader element and the drill sleeve being axially movable by the application of axial pressure on the tool shank, the axial movement of the drill sleeve taking place after a preliminary, and then along with a further, axial movement of the spreader element, the tool shank is biased against axial movement in the direction of advance by a first compression spring bearing against the drill sleeve, and the drill sleeve by a second compression spring bearing against a part of said abutment piece and that the power of the first compression spring is smaller than that of the second compression spring.

2. A drilling tool adapted to produce a radial enlargement along a cylindrical drilled hole, said tool comprising a drill sleeve with at least one slot therein, at least one cutter mounted in said slot, means for retaining said cutter in said slot against axial and rotational movement relative to said sleeve, and a spreader element provided with at least one chamfered surface mounted within said sleeve and movable axially relatively to the latter to engage said cutter with the chamfered surface and push out the cutter radially relatively to said sleeve, the improvement in which the tool is provided with a directly-drivable and rotatable shank which receives said drill sleeve, is close-fittedly engaged with the latter in the peripheral direction, is movable relatively to the sleeve in the axial direction, and is firmly connected to said spreader element, and in which the tool further includes an abutment piece to which the end of the drill sleeve projecting from the elementary drilled hole is connected in the working condition and which abuts against the work to determine the position of the radial enlargement in the drilled hole, both the spreader element and the drill sleeve being axially movable by the application of axial pressure on the tool shank, a first compression spring located within said drill sleeve and in bearing contact with said sleeve and said shank, a second compression spring having a more powerful preloading than said first compression spring and located radially outwardly from said first compression spring, said second compression spring arranged to bias said drill sleeve in the direction out of the cylindrical drilled hole, the axial movement of the drill sleeve taking place after a preliminary, and then along with further, axial movement of the spreader element against the biasing action of said first and second compression spring, the axial advance of the spreader element alone, and the axial advance of the spreader element together with the drill sleeve, are limited by abutment of a crosspiece on the tool shank against the end of the drill sleeve and by application of the drill sleeve against the abutment piece.

* * * * *